United States Patent
Kern, Jr. et al.

(10) Patent No.: US 7,147,517 B1
(45) Date of Patent: Dec. 12, 2006

(54) LINE TONE ADAPTER FOR A CABLE TEST SYSTEM

(75) Inventors: Joseph F. Kern, Jr., Islip, NY (US); Harold A. Hepensteil, Mattituck, NY (US)

(73) Assignee: Aines Manufacturing Corp., Ronkonkoma, NY (US)

( * ) Notice: Subject to any disclaimer, the term of this patent is extended or adjusted under 35 U.S.C. 154(b) by 0 days.

(21) Appl. No.: 11/232,349

(22) Filed: Sep. 22, 2005

(51) Int. Cl.
*H01R 25/00* (2006.01)

(52) U.S. Cl. ...................... 439/638; 324/538

(58) Field of Classification Search .............. 439/638, 439/639, 535, 653; 324/538
See application file for complete search history.

(56) References Cited

U.S. PATENT DOCUMENTS

| | | | |
|---|---|---|---|
| 4,541,680 A | 9/1985 | Johnston | |
| 4,553,085 A | 11/1985 | Canzano | |
| 4,612,412 A | 9/1986 | Johnston | |
| 4,648,682 A | 3/1987 | Tubbs | |
| 4,670,709 A | 6/1987 | Iredale | |
| 4,740,172 A | 4/1988 | Tubbs | |
| 4,779,052 A | 10/1988 | Levy et al. | |
| 4,864,225 A | 9/1989 | Long et al. | |
| 4,920,555 A | 4/1990 | Ingalsbe | |
| 5,401,192 A | 3/1995 | Briones et al. | |
| 5,407,366 A | 4/1995 | Briones et al. | |
| 5,565,784 A | 10/1996 | De Renne | |
| 5,831,440 A * | 11/1998 | Oldfield | 324/637 |
| 5,914,608 A | 6/1999 | Wissman et al. | |
| D416,861 S | 11/1999 | Fun | |
| 6,213,815 B1 * | 4/2001 | Wu | 439/638 |
| 6,290,538 B1 | 9/2001 | Pocrass | |
| 6,344,748 B1 | 2/2002 | Gannon | |
| 6,437,580 B1 | 8/2002 | Gale | |
| 6,786,757 B1 | 9/2004 | Pocrass | |
| 6,798,183 B1 | 9/2004 | Bohley et al. | |
| 7,011,550 B1 * | 3/2006 | Lai et al. | 439/638 |
| 2003/0114047 A1 * | 6/2003 | Yao | 439/638 |
| 2003/0222653 A1 | 12/2003 | Bohley et al. | |
| 2004/0087214 A1 | 5/2004 | Cho | |

* cited by examiner

*Primary Examiner*—Tho D. Ta
(74) *Attorney, Agent, or Firm*—Diederike & Whitelaw, PLC

(57) ABSTRACT

A line tone adapter, including a housing, first and second cable connectors and a line tone generator input port, is employed to interface between a tone generator, having an output connector of a first type, and a cable to be tested, with the cable to be tested having attached thereto a connector of either a second or third type that cannot mate with the output connector of the first type. The line tone generator input port is designed to mate with the output connector of the first type, while the first and second connectors are designed to mate with connectors of the second and third types respectively. Preferably the connector of the first type is an RJ11 plug, with the connectors of the second and third types being male and female coaxial cable connectors.

14 Claims, 3 Drawing Sheets

LINE TONE ADAPTER FOR A CABLE TEST SYSTEM

BACKGROUND OF THE INVENTION

1. Field of the Invention

The present invention pertains to the art of cable testing and, more particularly, to a cable test system including a line tone adapter for interfacing between a line tone and a cable.

2. Discussion of the Prior Art

Cable testing systems are known in the art. When installing cable, such as coaxial cable for audio/visual components or broadband internet, in a dwelling or other structure, one end of the cable can be located quite remote from another, opposing end of the cable. That is, one end of the cable is located in a particular room while the opposing end of the cable is located at a central panel or the like. Typically, multiple cables are employed in a dwelling such that there are a plurality of cable ends at the central panel. Often times it becomes necessary to identify each of the plurality of cable ends at the central panel.

One method employed to identify the cable is to send a tone into one end of a cable and receive the tone at the other end. More specifically, a tone generator is connected to one end of the cable, typically the end of the cable located remote from the central panel. The tone generator includes a cable connection designed to directly mate with a connector attached to the end of the cable, as well as internal circuitry that, upon activation, generates a signal or tone. The tone is passed into the cable toward the opposing end. A technician, positioned at the central panel, can then check for the tone with a tone receiver to identify the particular cable.

Phone technicians face problems similar to cable technicians. That is, when installing a phone system, each phone wire must be identified, particularly when being assigned an individual or unique phone number. In a manner similar to that described above, each phone wire has a first end connected to a phone jack located in one portion of a dwelling, or other structure. The first end extends to a second end which is typically located in a central panel in another portion of the dwelling. To identify the wires, a tone generator is connected to the first end of the wire and activated to generate a signal that is sent towards the second end at the central panel. Unlike cable technicians which have tone generators that connect to coaxial connectors, phone technicians possess tone generators that are provided with a connector that can only be received by the phone jack. Typically the connector is an RJ11 plug. However, other plug configurations can also be employed, depending on the particular installation.

Due to advancements in cable technology and, in particular, the advent of high speed cable connections, many companies now offer phone service, as well as broadband internet connections, over cable lines. Given the differences between phone and cable connectors, phone technicians are now required to carry one tone generator that can connect to phone lines (jacks) and a separate tone generator that can connect to cable connections. That is, phone technicians that desire to service both conventional and cable systems must purchase and maintain at least two distinct tone generators.

Based on the above, there exists a need for an adapter that can interface between a tone generator designed for use with phone systems, and cable connectors. More specifically, there exists a need for a line tone adapter including an input that can mate with a phone plug and outputs that can selectively connect to either a male or female cable connector.

SUMMARY OF THE INVENTION

The present invention is directed to a line tone adapter for a cable test system including a tone generator provided with an output connector of a first type, preferably an RJ11 plug. The tone generator, when activated, outputs a signal through the line tone adapter into a cable. More specifically, the line tone adapter interfaces between the tone generator and a cable to be tested, with the cable to be tested having attached thereto a connector of either a second or third type neither of which can mate with the output connector of the first type. Typically, the connector of the second type is provided on both ends of the cable, while the connector of the third type is provided at a wall jack.

In accordance with the invention, the line tone adapter includes a housing, a cable connector supported by the housing and a line tone generator input port. Preferably, the line tone generator input port is designed to mate with the connector of the first type. More preferably, the line tone adapter includes first and second cable connectors, with the first cable connector being a female connector adapted to mate with a connecter of the second type and the second cable connector being a male connector adapted to mate with a connector of the third type. With this arrangement, the line tone adapter can interface either at a wall connection to which the first end of the cable is secured or to an interface cable that extends outward from the wall or the wall connection.

In accordance with the most preferred form of the invention, the line tone adapter is designed to interface between a coaxial cable and a line tone generator configured to test phone lines. That is, the tone generator input port is configured to mate with a phone connector, such as an RJ11 plug. In this manner, technicians who already possess a tone generator for testing phone lines, need simply employ the line tone adapter of the present invention to test cable and thus are not required to purchase designated tone generators for each application.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
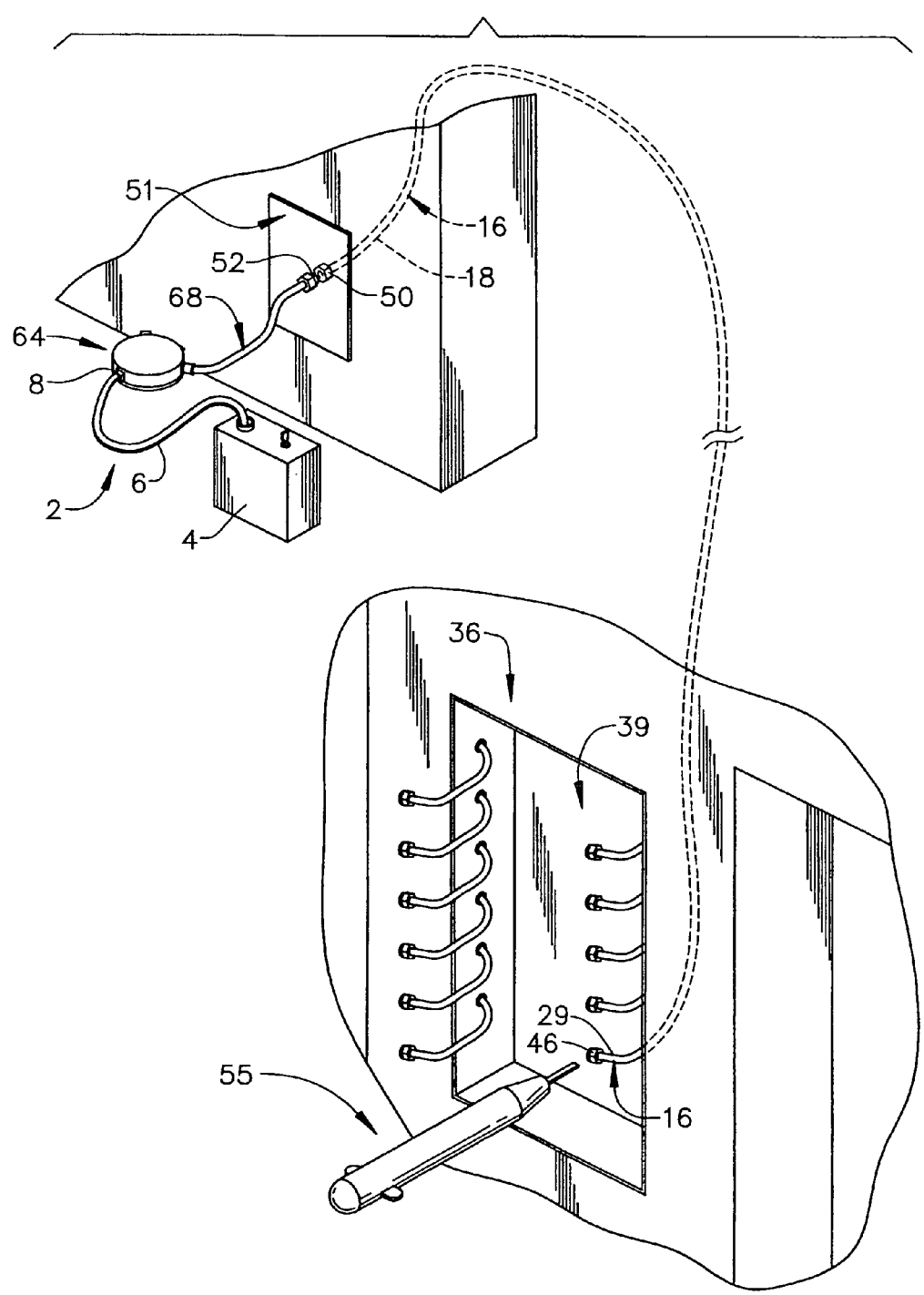
FIG. 1 is a partial, perspective view of portions of a dwelling illustrating a line tone adapter of the present invention being employed to identify a cable.

With initial reference to FIG. 1, a cable testing system constructed in accordance with the present invention is generally indicated at 2. Cable testing system 2 includes a tone generator 4 having an output lead 6 provided with an output connector 8. Output connector 8 is preferably of a first type and, in accordance with the most preferred form of the invention, is constituted by an RJ11 plug. That is, tone generator 4 is configured to be employed in identifying conductors used in telephone systems and, thus, would not be able to be directly connected to a cable 16. In the embodiment shown, cable 16 is constituted by a coaxial cable of a type which is typically employed in transferring audiovisual data and, in the advent of broadband technology, also used in high-speed internet services.

As shown, cable 16 includes a first end 18, located in one portion of a dwelling, that extends to a second end 29 terminating in a main connector panel 36 located in another portion of the dwelling. Second end 29, together with various other second ends (not separately labeled) of a plurality of cables 39, is actually connected to a main input panel (not shown) for cable TV, high-speed data or the like. Towards that end, second end 29 of cable 16 is provided with a connector 46 of a second type. Likewise, first end 18 is provided with a cable connector 50 also of second type. Cable connectors 46 and 50 are preferably male coaxial cable connectors, with connector 50 being secured to a wall jack plate 51 having a connector 52 of a third type.

In any case, when connecting cables 39 to main connection panel 36, a technician must be able to identify each of the plurality of cables 39 with a particular end point. Towards that end, a technician employs a line tone receiver 55 which is designed to receive a tone output by line tone generator 4 in a manner that will be discussed more fully below. However, given that tone generator 4 has an output connector 8 of a first type that cannot mate with connector 46 of the second type or connector 52 of the third type, a line tone adapter 64 constructed in accordance with the present invention is employed to interface between tone generator 4 and cable 16.

As cable 16 terminates at wall jack plate 51, an interface or intermediate cable 68 is used to connect an electronic device, such as a TV or computer (note shown), to cable 16. However, it should be understood that interface cable 68 is not required and is only employed in typical situations. In any case, line tone adapter 64 can be connected directly to connector 52, wall jack plate 51 or to intermediate cable 68 as will be detailed more fully below.

Figure 2:
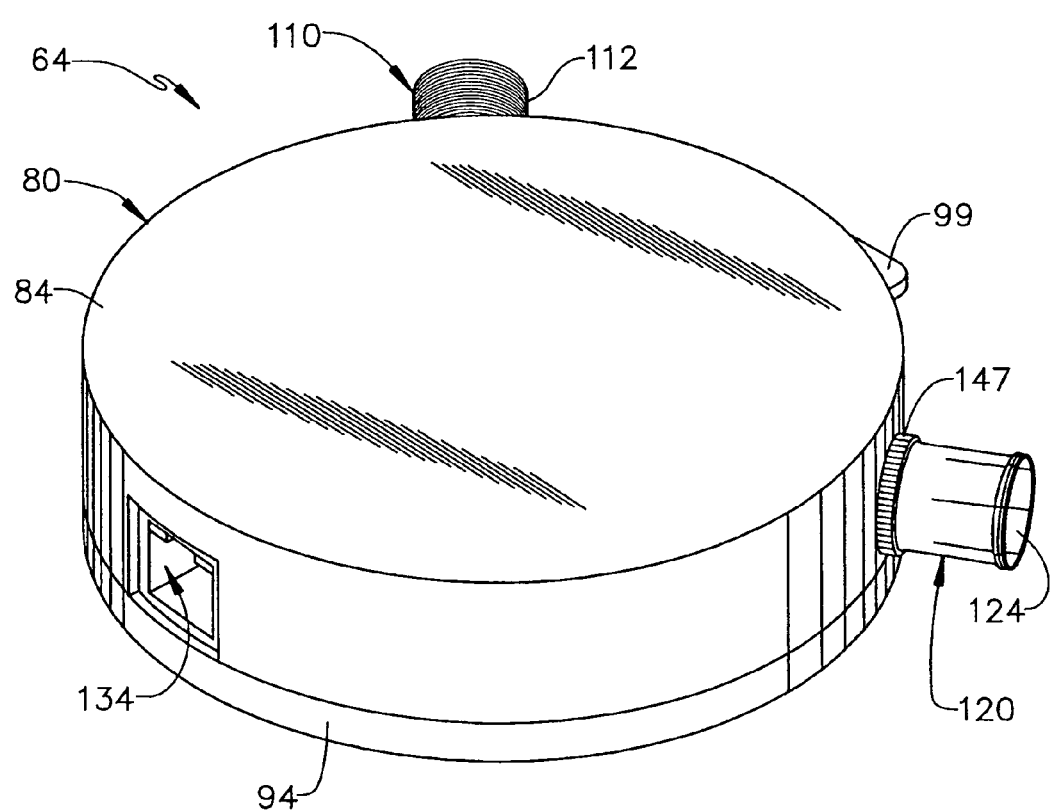
FIG. 2 is a bottom right perspective view of the line tone adapter of the present invention.
Figure 3:
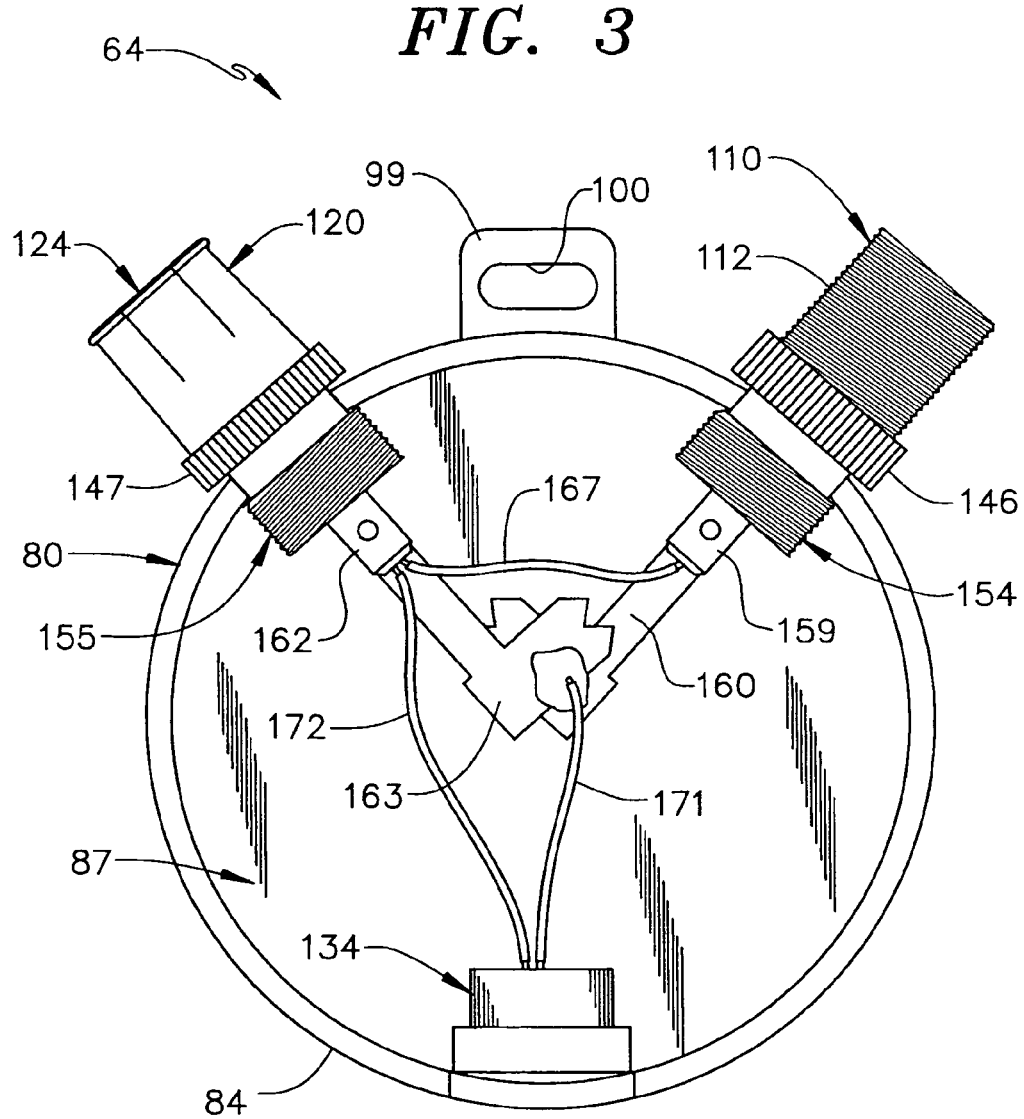
FIG. 3 is a plain view of the line tone adapter of FIG. 2 shown with a cover removed exposing internal wiring and connections.

As best shown in FIGS. 2 and 3, line tone adapter 64 includes a housing 80 having a main body portion 84 within which is defined an interior chamber 87. Main body portion 84 is provided with a cover 94, as well as a tab member 99 that includes an opening 100 to allow attachment of a lanyard or the like (not shown). In further accordance with the invention, line tone adapter 64 includes a first cable connector 110 that includes an externally threaded portion 112 adapted to mate with a connector of the second type. That is, first cable connector 110 constitutes a female cable connector, preferably a female coaxial cable connector. In addition, line tone adapter 64 is provided with a second cable connector 120 that includes a hollow interior portion 124 which is designed to mate with a connector of the third type. More specifically, cable connector 120 constitutes a male cable connector, preferably a male coaxial cable connector. Finally, a tone generator input port 134 is supported by housing 80 and is electrically connected to first and second cable connectors 110 and 120 in a manner that will be described more fully below. Tone generator input port 134 is preferably constituted by an RJ11 socket that is designed to receive the connector of the first type.

As best shown in FIG. 3, first and second cable connectors 110 and 120 are secured to housing 80 through corresponding lock nuts 146 and 147. That is, each cable connector 110, 120 includes a corresponding terminal end portion 154, 155 that extends into hollow interior portion 87. As shown, each terminal end portion 154, 155 includes corresponding first and second electrical terminals 159, 160 and 162, 163 that are electrically connected to tone generator input port 134. More specifically, first electrical terminals 159 and 162 are interconnected through a jumper wire 167, while second connectors 160 and 163 are shown physically attached and joined with a solder joint. First and second connector wires 170 and 171 extend from tone generator input port 134 and are connected to first terminal 162 and second terminal 163 respectively. With this arrangement, first and second connectors 110 and 120 are wired in parallel to tone generator input port 134 such that any signals received at input port 134 will be sent to both cable connectors 110 and 120.

In accordance with the invention, line tone adapter 64 serves as an interface between line tone generator 4 adapted for use in telephone installations and cable 16 adapted for use in audiovisual/broadband communications. Thus, in order to identify a particular cable 16, output connector 8 of line tone generator 4 is connected to tone generator 4 at input port 134. At this point, cable 16 is connected to one of first and second cable connectors 110 and 120. Actually, given that first and second cable connectors 110 and 120 can connect with connectors of the second type and the third type respectively, line tone adapter 64 can be connected either directly to wall jack plate 51 or directly to a cable, such as intermediate cable 68. In any case, once cable 16 is secured to line tone adapter 64, tone generator 4 is activated so as to output a signal into cable 16. The signal is input from tone generator input port 134 and passed out to cable 16 through one of first and second cable connectors 110 and 120 depending upon the particular connection employed. At this point, a technician need simply access an opposing end of cable 16 and, using line tone receiver 55, determine which of the plurality of cables 39 contains the signal.

Based on the above, it should be readily apparent that, through the use of line tone adapter 4, a technician can easily identify a particular one of a plurality of cables 39 using a tone generator adapted for telephone use, i.e., a tone generator used primarily in telephone installations. Also, given the plural connectors provided on line tone adapter 64, a technician can connect directly to a cable wall jack or an interface cable without requiring additional equipment. That is, a technician can serve as both installations and the new cable installations without requiring additional, costly hardware such that line tone adapter 64 is both versatile and economical. Although described with reference to a preferred embodiment of the invention, it should be readily understood that various changes and/or modifications can be made to the invention without departing from the spirit thereof. For instance, while shown and described with coaxial cable connectors, various other types of connectors could be employed depending upon a particular operating environment. In general, the invention is only intended to be limited by the scope of the following claims.

We claim:

1. A cable testing system comprising:
   a tone generator having an output connector of a first type, said tone generator, when activated, outputting a signal; and
   a line tone adapter for interfacing between the tone generator and a cable to be tested, with the cable to be tested having attached thereto a connector of either a second or third type that cannot directly mate with the output connector of the first type, said line tone adapter including:
- a housing;
- a first cable connector supported by the housing, said first cable connector being constituted by a female connector adapted to mate with a connector of the second type;
- a second cable connector supported by the housing, said second cable connector being constituted by a male connector adapted to mate with a connector of the third type; and
- a tone generator input port supported by the housing and connected to both of the first and second cable connectors, said tone generator input port being adapted to mate with the output connector of the first type wherein, upon electrically connecting a cable to one of the first and second cable connectors, electrically connecting the tone generator to the tone generator input port and activating the tone generator, said line tone adapter transfers the signal from the tone generator to the cable.

2. A cable testing system comprising:
a tone generator having an output connector of a first type, said tone generator, when activated, outputting a signal; and
a line tone adapter for interfacing between the tone generator and a cable to be tested, with the cable to be tested having attached thereto a connector of a second type that cannot directly mate with the output connector of the first type, said line tone adapter including:
- a housing;
- a cable connector supported by the housing, said cable connector being adapted to mate with a connector of the second type; and
- a tone generator input port supported by the housing and connected to the cable connector, said tone generator input port being adapted to mate with the output connector of the first type wherein, upon electrically connecting a cable to the cable connector, electrically connecting the tone generator to the tone generator input port and activating the tone generator, said line tone adapter transfers the signal from the tone generator to the cable.

3. The cable testing system according to claim 2, wherein the tone generator input port is constituted by an RJ11 socket.

4. The cable testing system according to claim 2, wherein the housing includes a main body portion having an interior chamber and a cover portion, said cover portion being connected to the main body portion so as to enclose the interior chamber.

5. The cable testing system according to claim 2, further comprising: another cable connector supported by the housing, said another cable connector being of a third type that cannot directly mate with the connector of the first type.

6. The cable testing system according to claim 5, wherein the cable connector is constituted by a female cable connector.

7. The cable testing system according to claim 5, wherein the another cable connector is constituted by a male cable connector.

8. The cable testing system according to claim 5, wherein said cable connector and said another cable connector are constituted by a coaxial cable connectors.

9. The cable testing system according to claim 5, wherein the cable connector and the another cable connector are connected in parallel to the tone generator input port.

10. A line tone adapter for interfacing between a tone generator and a cable to be tested, with the cable to be tested having attached thereto a connector of either a second or third type that cannot directly mate with an output connector of a first type, said line tone adapter comprising:
- a housing;
- a first cable connector supported by the housing, said first cable connector being constituted by a female connector adapted to mate with a connector of the second type;
- a second cable connector supported by the housing, said second cable connector being constituted by a male connector adapted to mate with a connector of the third type; and
- a tone generator input port supported by the housing and connected to both of the first and second cable connectors, said tone generator input port being adapted to mate with an output connector of the first type wherein, upon electrically connecting a cable to one of the first and second cable connectors, electrically connecting the tone generator to the tone generator input port and activating the tone generator, said line tone adapter transfers the signal from the tone generator to the cable.

11. The line tone adapter according to claim 10, wherein said the first and second cable connectors are constituted by a coaxial cable connectors.

12. The line tone adapter according to claim 10, wherein the tone generator input port is constituted by an RJ11 socket.

13. The line tone adapter according to claim 10, wherein the housing includes a main body portion having an interior chamber and a cover portion, said cover portion being connected to the main body portion so as to enclose the interior chamber.

14. The line tone adapter according to claim 10, wherein the first and second cable connectors are wired in parallel to the tone generator input port.

* * * * *